United States Patent [19]

Goto

[11] Patent Number: 5,458,842
[45] Date of Patent: Oct. 17, 1995

[54] METHOD FOR MOLDING STEERING WHEELS

[75] Inventor: Shinichi Goto, Aichi, Japan

[73] Assignee: Toyoda Gosei Co., Ltd., Aichi, Japan

[21] Appl. No.: 219,308

[22] Filed: Mar. 28, 1994

[30] Foreign Application Priority Data

Apr. 15, 1993 [JP] Japan .................................. 5-088895

[51] Int. Cl.$^6$ .......................... B29C 45/33; B29C 69/02
[52] U.S. Cl. ...................... 264/296; 264/294; 264/328.7
[58] Field of Search .................................. 264/294, 296, 264/328.8, 266, 328.7, 236, 320, 347, 297.5

[56] References Cited

U.S. PATENT DOCUMENTS

| | | | |
|---|---|---|---|
| 4,793,659 | 12/1988 | Oleff et al. | 264/328.12 |
| 4,810,444 | 3/1989 | Alberino et al. | 264/328.7 |
| 4,876,050 | 10/1989 | Horton | 264/328.7 |
| 5,053,181 | 10/1991 | Ohasi et al. | 264/328.7 |
| 5,090,886 | 2/1992 | Jaroschek | 264/328.8 |
| 5,149,479 | 9/1992 | Nakajima | 264/328.7 |

FOREIGN PATENT DOCUMENTS 57-33067  2/1982  Japan .

*Primary Examiner*—Jan H. Silbaugh
*Assistant Examiner*—Angela Ortiz
*Attorney, Agent, or Firm*—Cushman Darby & Cushman

[57] ABSTRACT

A method of molding a steering wheel of the type having no core in its ring is provided. The mold is formed with a first cavity for forming the ring and a second cavity arranged therein with a slide core for forming cooling members. With the slide core being in a lower position, a polypropylene resin in molten state is injected to fill the first and second cavities. The, resin in the second cavity is cooled and set first because a volume thereof is less than that of the first cavity. After this, the slide core is moved to embed the cooling members into the first cavity so that the inset resin in the central portion of the first cavity may be cooled by the cooling members. Then, the unset resin in the first cavity has its solidification accelerated by contact with the cooling members. The steering wheel is extracted from the mold after the resin in the first cavity has been completely set.

8 Claims, 4 Drawing Sheets

METHOD FOR MOLDING STEERING WHEELS

BACKGROUND OF THE INVENTION

1. Field of the Invention

The present invention relates to a method for molding a steering wheel for use in a vehicle. More particularly, the present invention relates to a method for molding a steering wheel free of a core embedded in its circumferential ring.

2. Description of Related Art

There has been proposed a steering wheel having a core embedded in a resin. Due to the core, the steering wheel of this type is advantageous in that it is durable against deformation or the like.

It has been desired for this technology to reduce the cost and the weight of the steering wheel. In order to meet this desire, a steering wheel has been developed having no core in its spoke or in its ring. This technology is disclosed in Japanese Patent Laid-Open No. 57-33067, for example. According to this technology, the coreless steering wheel is inferior in respect of rigidity as compared to the steering wheel having a core. However, the cost and weight of the coreless steering wheel is less than one having a core.

Incidentally, the steering wheel of this type is generally constructed to have its inside filled with a resin (in a solid state). Specifically, at the time of molding of the steering wheel, a mold having a predetermined shape has its cavity filled with a plastic resin. After this resin has solidified, the steering wheel is obtained by extracting the solidified resin.

If, however, the solidification of the resin is insufficient at a cooling step of the molding process, the resin is liable to deform. Therefore, the resin cooling time period has to be extended so as to set the resin completely.

In case the steering wheel having the core is to be molded of a polypropylene resin, for example, the resin cooling time period required is about twenty to forty seconds. However, when a steering wheel having no core is to be molded of a polypropylene resin, the resin cooling time period required is as long as about 90 to 120 seconds. At the time of molding of the steering wheel having no core, therefore, a longer cooling time period is required in the molding method of the prior art, which decreases the working efficiency.

SUMMARY OF THE INVENTION

Accordingly, it is an object of the present invention to provide a method of molding a steering wheel of the type having no core which reduces a shortened resin cooling time period.

To achieve the foregoing and other objects and in accordance with the principles of the present invention, there is provided a method for molding a steering wheel having spokes connecting a ring and a boss by using a mold including a first cavity and a second cavity, at least the ring being free from a core. The method includes a step of filling thermoplastic resin in a molten state into the first cavity and the second cavity, the first cavity having a shape corresponding to the ring, and the second cavity being communicated with the first cavity and having a shape corresponding to a contour of a cooling member. The method further includes steps of cooling the resin in the first cavity and the second cavity so that the resin in the second cavity is completely set while the resin in the first cavity is partially set, embedding the cooling member of the second cavity in the resin in the first cavity, cooling the resin in the first cavity so as to be completely set and extracting the resin of the first cavity out of the mold.

BRIEF DESCRIPTION OF THE DRAWINGS

The invention, together with the objects and advantages thereof, may best be understood by reference to the following description of the presently preferred embodiments together with the accompanying drawings, in which.

DETAILED DESCRIPTION OF THE INVENTION

An embodiment according to the present invention will be hereinafter described with reference to FIGS. 1 through 4(b). The steering wheel of the present embodiment has a core in a boss portion thereof. However, a ring and spokes are free from core members.

Figure 1:
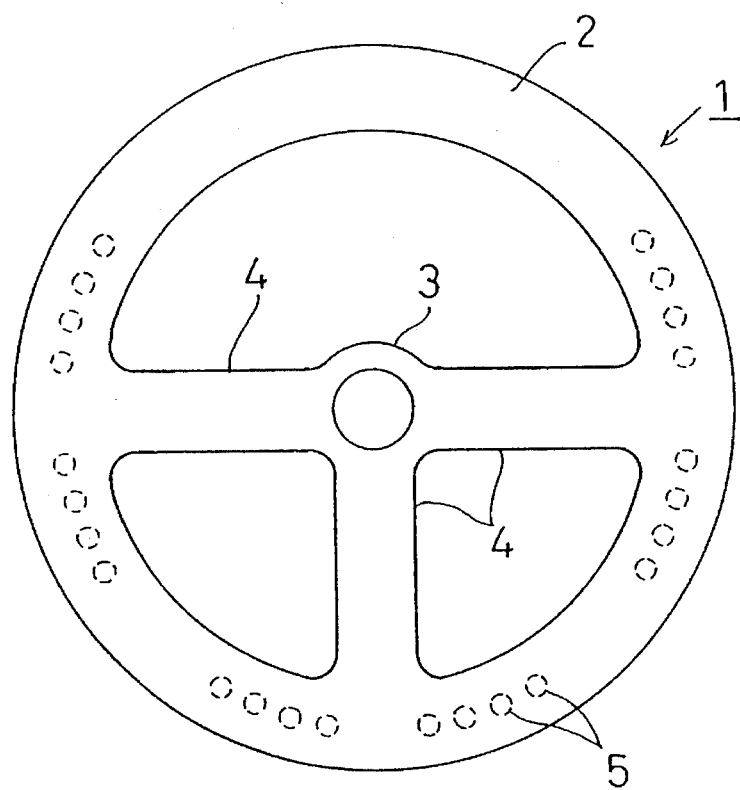
FIG. 1 is a front elevational view showing the steering wheel of the present invention.

As shown in FIG. 1, a steering wheel 1 is constructed to include a ring 2, a boss 3 positioned at the center of the ring 2, and three spokes 4 connecting the ring 2 and the boss 3. The ring 2 is preferably made mainly of a thermoplastic resin such as polypropylene (as will be referred to herein as "PP").

Figure 2:
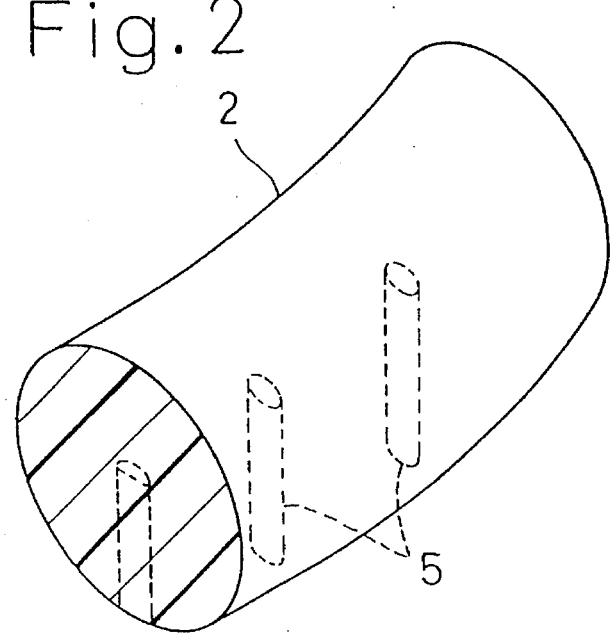
FIG. 2 is a perspective view of a portion of a ring of the steering wheel of FIG. 1.

In the ring 2, as shown in FIGS. 1 and 2, there are embedded a plurality of rod-shaped cooling members 5. These cooling members 5 are also preferably made of polypropylene. The cooling members 5 have a length less than the external diameter of the ring 2. Moreover, the cooling members 5 are arranged in spaced groupings near the connecting portions of the ring 2 and the spokes 4.

Figure 3:
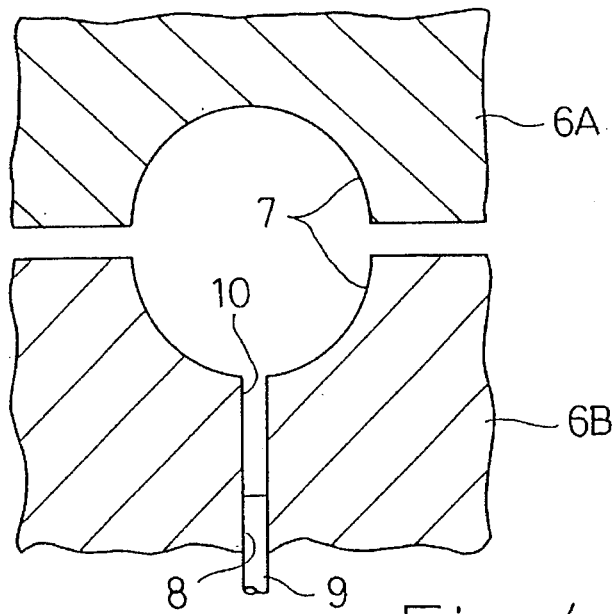
FIG. 3 is a sectional view showing a portion of a mold provided in accordance with the principles of the invention.
Figure 4:
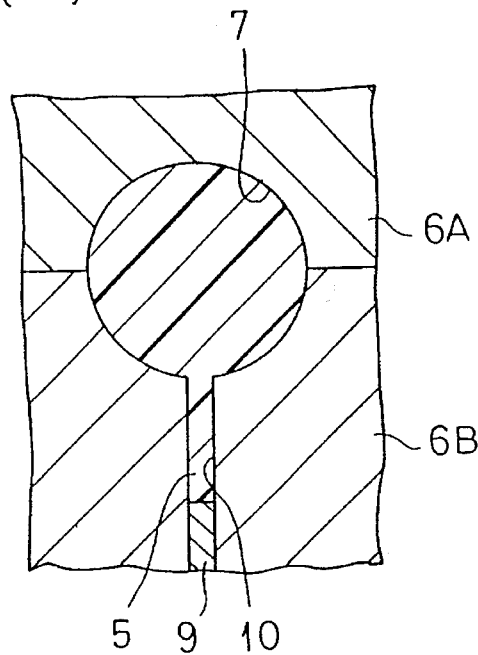
FIGS. 4(a) and 4(b) are both sectional views of the mold of FIG. 3 for explaining the process of molding the steering wheel.
Figure 4:
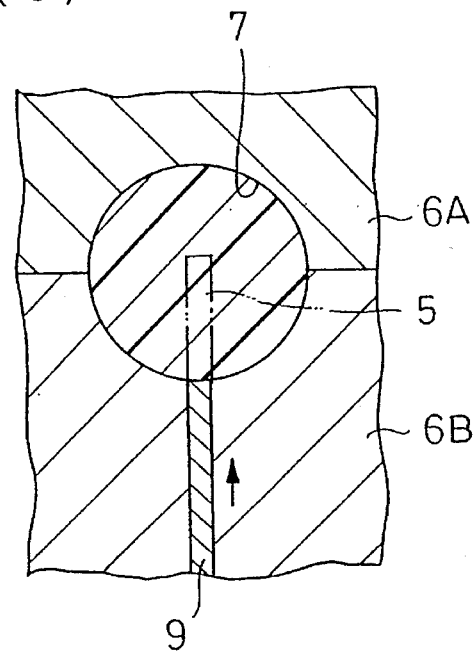

Next, the mold for molding the aforementioned steering wheel 1 will be hereinafter described. As shown in FIG. 3, the mold is composed of upper and lower halves 6A and 6B, which define together a first cavity 7 providing a contour of the steering wheel 1. In the present embodiment, this cavity 7 mainly molds the ring 2 of the steering wheel 1. The lower mold half 6B is formed with holes 8 extending perpendicularly to the ring 2 (as shown in the vertical direction of the drawing). In each of the holes 8, there is slidably arranged a slide core 9 to establish a second cavity (for molding one of the cooling members) 10. Incidentally, these second cavities 10 are provided in spaced groupings corresponding to the locations of the cooling members 5 of FIG. 1.

Next, the method of molding the steering wheel 1 thus constructed will be hereinafter described.

With the slide core 9 being in its lower position, as shown in FIG. 4(a), a molten PP is injected at first from gates (not-shown) which are formed in the mold halves 6A and 6B. Then, the PP flows in the first and second cavities 7 and 10 to filling cavities 7 and 10. This PP is gradually cooled as its heat is conducted to the mold halves 6A and 6B. Hence, since the PP in the second cavity 10 is of less volume than that in the first cavity 7, it is cooled and solidified faster than the PP in the first cavity. As a result, the cooling members 5 are molded. At this stage, since the PP in the first cavity 7 has a greater volume than that in the second cavity 10, the PP is not completely cooled, at the central portion of the first cavity so as to be left partially unset.

Next, the slide core 9 is moved upwardly as shown in FIG. 4(b). In accordance with this movement, the cooling member 5 thus cooled and set, protrudes into the first cavity 7. As a result, the PP left unset in the first cavity 7 has its heat absorbed by the cooling member 5. Thus, the PP at the central portion of the first cavity 7 is promptly cooled by contact with the cooling member 5. In other words, the cooling step of the PP in the first cavity 7 is accelerated by the introduction of cooling member 5.

After the PP in the first cavity 7 has been completely set, the molding process is ended by extracting the steering wheel 1 out of the mold halves 6A and 6B.

According to the method of molding the steering wheel 1 of the present embodiment described above, the time period required for completely cooling the steering wheel 1 can be shortened to about 40 to 70 seconds, which is shorter than that (e.g., about 90 to 120 seconds) required of the molding method of the prior art. As a result, the time period for molding the steering wheel 1 can be remarkably shortened to improve the working efficiency.

Although only one embodiment of the present invention has been described herein, it should be apparent to those skilled in the art that the present invention may be embodied in many other specific forms without departing from the spirit or scope of the invention. Particularly, it should be understood that the present invention may be embodied in the following manner.

Figure 5:
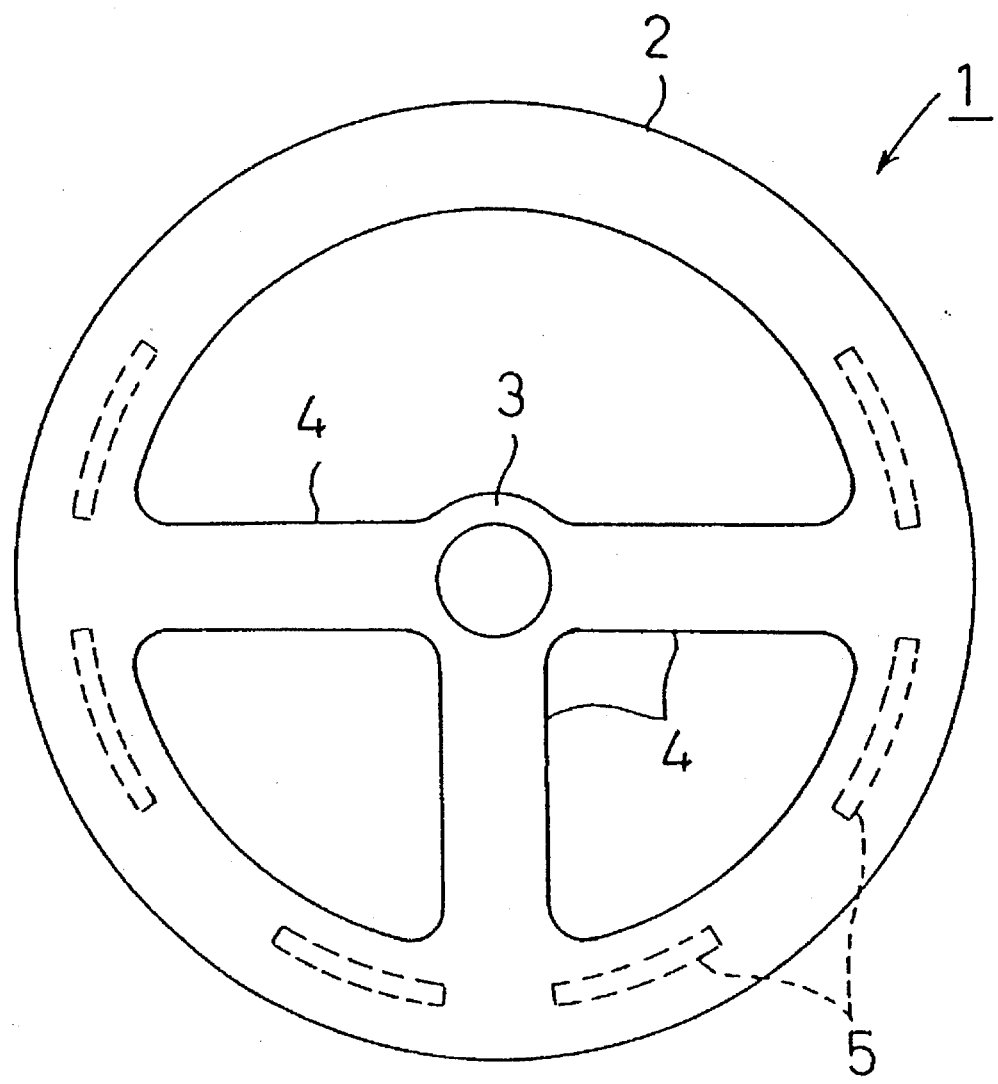
FIG. 5 is a front elevational view showing a modified steering wheel of the invention.

Although the rod-shaped cooling members 5 are embedded in the foregoing embodiment, they may be modified into plate-shaped members extending in an arcuate direction of the ring 2, as shown in FIG. 5.

Figure 6:
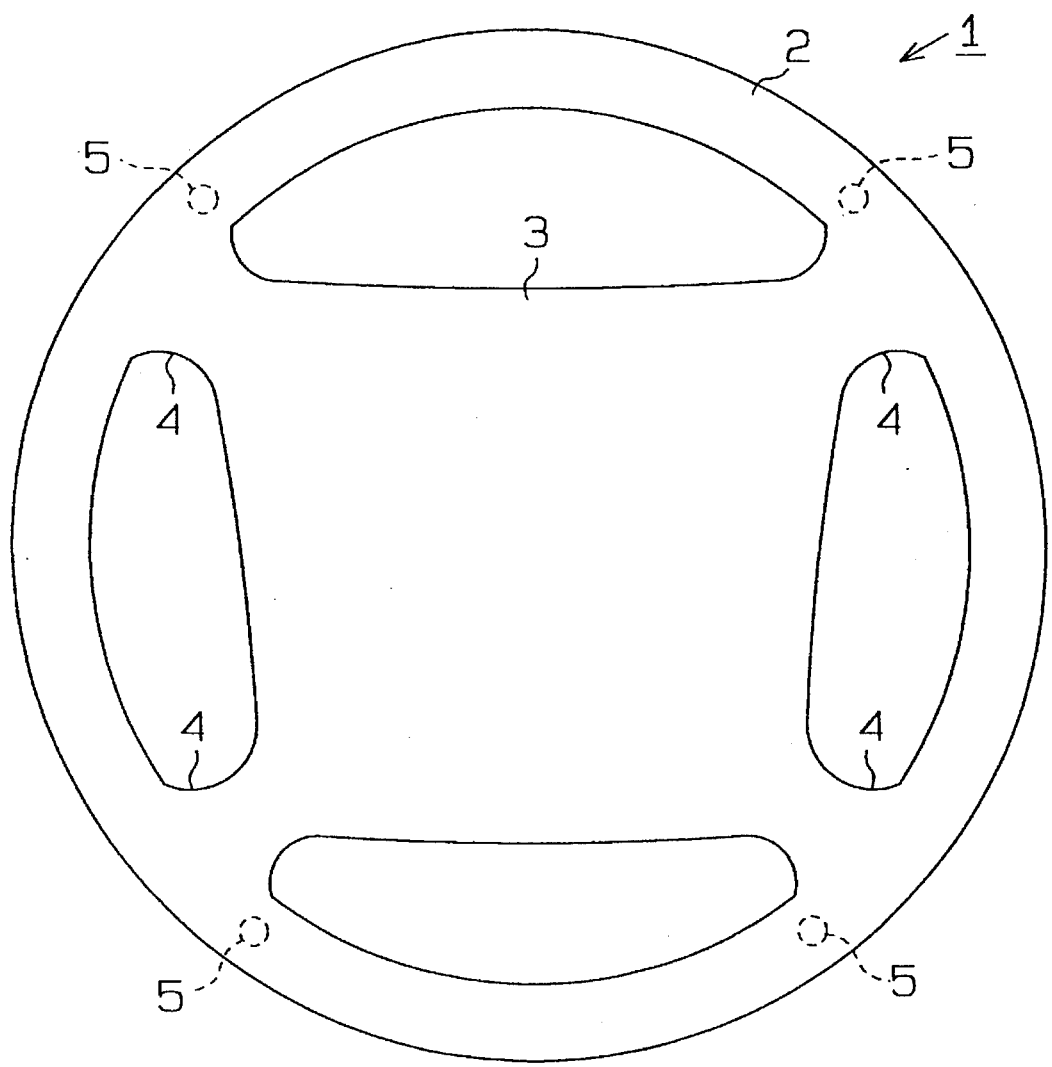
FIG. 6 is a front elevational view showing another steering wheel of the invention.

As shown in FIG. 6, on the other hand, construction may be modified such that one cooling member 5 is embedded at each of the connecting portions of the ring 2 and a spoke 4. If this construction is adopted, the efficient cooling can be achieved while minimizing the number of the cooling members 5. As a result, the cost can be reduced further.

In the embodiments thus far described, the present invention has been embodied into the steering wheel of the type having no core in both the ring 2 and the spokes 4. Despite this description, however, the present invention could be embodied in a steering wheel of the type having no core only in the ring 2. Moreover, the thermoplastic resin should not be limited to the polypropylene but may be exemplified by a variety of materials such as a polyamide resin.

Therefore, the present examples and embodiments are to be considered as illustrative and not restrictive, and the present invention is not to be limited to the details given herein but may be modified within the scope of the appended claims.

What is claimed is:

1. A method for molding a steering wheel having spokes connecting a ring and a boss by using a mold including adjacent first and second cavities, at least said ring being free from a core portion, said method comprising the steps of:

injecting a thermoplastic resin in a molten state into the first cavity and the second cavity so as to fill the first and second cavities, the first cavity having a shape corresponding to said ring, and the second cavity being communicated with the first cavity and having a shape corresponding to a contour of a cooling member;

cooling the resin in said first cavity and said second cavity so that the resin in the second cavity is completely set thus forming the cooling member while the resin in the first cavity is partially set;

moving the cooling member of the second cavity by moving a slide core arranged slidably in said second cavity so as to embed the cooling member into the partially set resin in said first cavity;

absorbing heat of said partially set resin in said first cavity by said cooling member so that the resin in said first cavity is completely set; and extracting the steering wheel out of said mold.

2. A method for molding a steering wheel according to claim 1, wherein the thermoplastic resin is polypropylene resin.

3. A method for molding a steering wheel according to claim 2, wherein said thermoplastic resin is polyamide resin.

4. A method for molding a steering wheel according to claim 1, wherein the resin cooling steps are carried out by releasing heat from the molten resin in said mold.

5. A method for molding a steering wheel according to claim 1, wherein said cooling member has a rod shape.

6. A method for molding a steering wheel according to claim 1, wherein said cooling member has a plate shape.

7. A method for molding a steering wheel according to claim 1, wherein said ring and said spokes are formed integrally with each other.

8. A method for molding a steering wheel according to claim 7, wherein the cooling members are embedded in portions of said ring near said spokes.

* * * * *